United States Patent
Gray et al.

(10) Patent No.: US 8,184,016 B2
(45) Date of Patent: May 22, 2012

(54) GRAPHICAL REPRESENTATION OF UTILITY MONITORING SYSTEM HAVING MULTIPLE MONITORING POINTS

(75) Inventors: Anthony R. Gray, Victoria (CA); Shaun M. Hope, Alameda, CA (US); Jon A. Bickel, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 1034 days.

(21) Appl. No.: 12/126,433

(22) Filed: May 23, 2008

(65) Prior Publication Data
US 2009/0289809 A1    Nov. 26, 2009

(51) Int. Cl.
G08C 19/00    (2006.01)
(52) U.S. Cl. .................................... 340/870.11
(58) Field of Classification Search .............. 340/870.11
See application file for complete search history.

(56) References Cited

U.S. PATENT DOCUMENTS

| | | | |
|---|---|---|---|
| 6,122,603 A | | 9/2000 | Budike, Jr. |
| 6,222,559 B1 * | | 4/2001 | Asano et al. ................ 345/440 |
| 6,285,367 B1 * | | 9/2001 | Abrams et al. ............... 715/854 |
| 7,266,781 B1 * | | 9/2007 | Burlowski ................... 715/834 |
| 7,921,379 B1 * | | 4/2011 | Ko ............................... 715/834 |
| 2008/0307369 A1 | | 12/2008 | Liu et al. |

OTHER PUBLICATIONS

European Search Report for European Application No. EP 09 16 0708 dated Oct. 6, 2009 (4 pages).
U.S. Appl. No. 11/174,100, filed Jul. 1, 2005, Bickel et al.
U.S. Appl. No. 11/173,743, filed Jul. 1, 2005, Bickel et al.
PowerLogic enterprise energy management solutions for industrial facilities, Square D, LaVergne, TN, Feb. 2007 (7 pages).

* cited by examiner

*Primary Examiner* — Stephen W Jackson
(74) *Attorney, Agent, or Firm* — Nixon Peabody LLP

(57) ABSTRACT

A method of graphically representing values of at least one selected parameter at multiple monitoring points in a utility system, comprises receiving data measured at the multiple monitoring points; determining the values of the selected parameter at the multiple monitoring points, based on the received data, and using the values to generate a graphical representation of the values of the selected parameter at the multiple monitoring points, the graphical representation including shapes having (1) sizes representative of the magnitudes of the values and (2) locations representative of the hierarchy of the monitoring points. In one application, the selected parameter is at least one of electrical power and energy consumed in portions of an electrical power distribution system that correspond to the multiple monitoring points.

17 Claims, 6 Drawing Sheets

GRAPHICAL REPRESENTATION OF UTILITY MONITORING SYSTEM HAVING MULTIPLE MONITORING POINTS

FIELD OF THE INVENTION

The present invention relates generally to utility systems having multiple monitoring points and, in particular, to graphical representations of such systems.

BACKGROUND OF THE INVENTION

Auto-learned hierarchy algorithms are described in commonly assigned U.S. Pat. No. 7,272,518, titled "Automated Hierarchy Classification in Utility Monitoring Systems," issued Sep. 18, 2007, which automatically determine a hierarchical arrangement of monitoring devices within a utility system, typically a radial-fed utility system having a main source of a utility, and in commonly assigned U.S. patent application Ser. No. 12/151,309, filed May 6, 2008, titled "Automated Hierarchical Classification for Utility Systems with Multiple Sources," which describes an automated method for determining a hierarchy of a utility system that includes more than one source, wherein the automated method can differentiate among various types of multiple-source utility models.

Having a thorough knowledge of a utility system's layout is essential to understanding and characterizing the utility system; however, utility meters typically only provide discrete utility operating parameters with no context for the data. Having hierarchical context for the monitoring system data is a powerful tool that provides many useful benefits including troubleshooting system problems, improving system efficiencies, predicting failures and degradation, locating the source of disturbances and interruptions, and modeling system responses.

Utility monitoring systems typically rely on the user's knowledge of the utility system and the utility monitoring system to put the data in context. Visualizations typically use one-line diagrams to provide hierarchical context for more meaningful configuration, analysis and reporting. Many monitoring systems are extensive, and the ability to provide context is confined to small areas such as monitoring device displays and/or computer displays. With monitoring systems that include large and complex hierarchies of meters it can be difficult to obtain a quick concise picture of where energy is being consumed within an enterprise. The problem is compounded as more devices are included in the hierarchy.

Graphical representations of information and parameters in utility monitoring systems provide the end-user with an intuitive means of understanding multifaceted data. A good graphical representation can allow the end-user to create, edit, view and manage multiple hierarchies of different types so that monitoring system data may be placed in an appropriate context for configuration analysis and reporting.

SUMMARY OF THE INVENTION

Briefly, according to an embodiment of the present invention, a method of graphically representing values of at least one selected parameter at multiple monitoring points in a utility system, comprises receiving data measured at the multiple monitoring points; determining the values of the selected parameter at the multiple monitoring points, based on the received data, and using the values to generate a graphical representation of the values of the selected parameter at the multiple monitoring points, the graphical representation including shapes having (1) sizes representative of the magnitudes of the values and (2) locations representative of the hierarchy of the monitoring points. In one application, the selected parameter is at least one of electrical power and energy consumed in portions of an electrical power distribution system that correspond to the multiple monitoring points.

In one implementation, the shapes used in the graphical representation include segments of concentric circular areas in which the angular extent of each segment represents the magnitude of at least one of the values, and the radial and circumferential locations of the segments represent the hierarchy of the monitoring points. Successive shapes along a common radial line from the center of the concentric circular areas are increasingly subordinate to other shapes on that common radius, and the angular extents of the segments of circular areas having a common radius represent the fractional size of the selected parameter for the monitoring points relative to the overall total for the parameter.

In another implementation, the shapes include segments of rectangular areas in which the width of each segment represents the magnitude of at least one of the values, and the locations of the segments relative to each other represent the hierarchy of the monitoring points. Segments of rectangular areas are arranged in multiple horizontal rows with the uppermost row representing the highest hierarchical level, and the segments in successive rows below the uppermost row are increasingly subordinate to the adjacent segment in the immediately preceding row. The lateral dimensions of the segments in a common row present the relative values of the selected parameter for the monitoring points in a common hierarchical level.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1A:
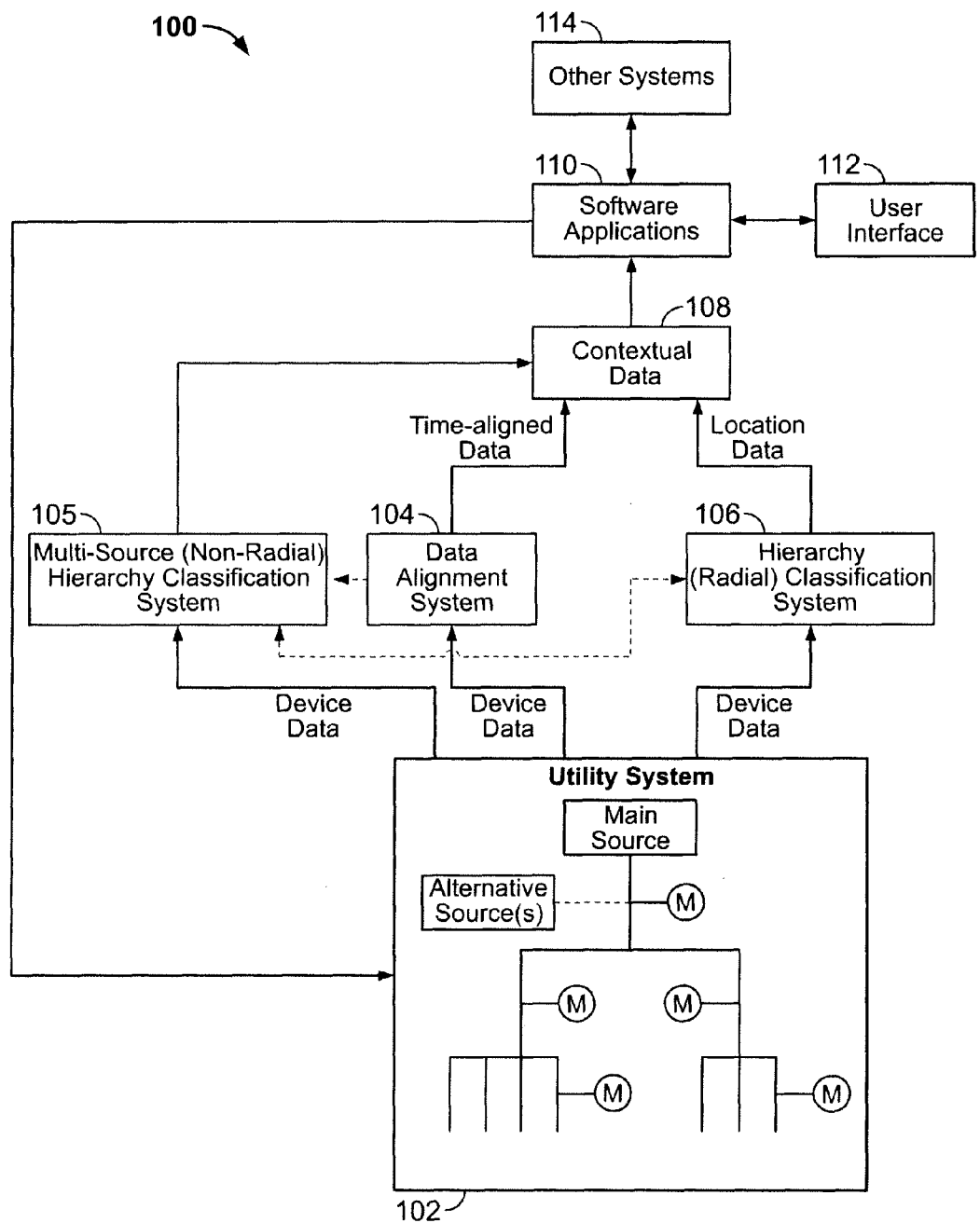
FIG. 1A is functional block diagram of an automated data integration monitoring system that includes a multi-source hierarchy classification system in accordance with aspects herein.

Turning now to FIG. 1, an automated data integrated monitoring system 100 is generally shown. A utility system 102 having a main source and one or more alternative sources and multiple intelligent electronic devices (hereafter "IEDs") or monitoring devices designated by the letter M provides data from each IED (M) that is communicated to an automated data alignment system 104, a multi-source hierarchical classification system 105, and an automated hierarchy classification system 106. As used herein, an IED or a monitoring device refers to any system element or apparatus with the ability to sample, collect, or measure one or more operational characteristics or parameters of the utility system 102. The utility being monitored in the utility system 102 can be any of the five utilities designated by the acronym WAGES, or water, air, gas, electricity, or steam. The parameters can be power, voltage, current, current distortion, voltage distortion, energy, or any parameter associated with any WAGES utility, such as volumetric flow rates, mass flow rates, volumetric flux and mass flux. For example, when the parameter is a voltage distortion, monitoring devices on the same level of the hierarchy will have roughly the same voltage distortion.

The data is aligned automatically in temporal or pseudo-temporal context in the automated data alignment system 104 and produces data that is temporally aligned such that it represents the data when it was actually seen simultaneously by the monitoring devices M in the power monitoring system 102. The hierarchy classification system 106 automatically learns the hierarchy of monitoring devices present in the utility system 102 and their positional relationships relative to one another. Examples of the hierarchy classification system 106 and the auto-learned hierarchy algorithms 400, 500, 550 associated therewith are described in commonly assigned U.S. Pat. No. 7,272,518, titled "Automated Hierarchy Classification in Utility Monitoring Systems," issued Sep. 18, 2007, and in commonly assigned PCT Patent Application No. PCT/US2006/034394, titled "Improvements in Hierarchy Determination for Power Monitoring Systems," filed Nov. 5, 2007.

A hierarchy as used herein includes a series of ordered groupings of things within a system. These relationships may be physical (based on a power system one-line diagram for example) or functional (based on cost centers or other organizational divisions). In an electrical power system context, a hierarchy describes the organization of the electrical power system (whether utility-side or demand-side of the point-of-common coupling (PCC)). As used herein, an "auto-learned hierarchy algorithm" refers to any of the auto-learned hierarchy algorithms disclosed in U.S. Pat. No. 7,272,518. The graphical representations described below can also be used with manually configured hierarchies, and with utility monitoring systems that are synchronized in different ways.

The data alignment system 104 aligns data, such as voltage, current, time, events, and the like, from the multiple IEDs in the utility system 102. When data from all the IEDs is aligned to the same point (or approximately the same point based on pseudo-temporal alignment) in time that the data occurred, the data can be put into a temporal or pseudo-temporal context from which additional decisions regarding hardware and software configuration can be automatically made or recommended. The measured data from various IEDs may be synchronized or approximately synchronized with each other within a temporal or pseudo-temporal context. Temporal alignment is more precise than pseudo-temporal alignment. Pseudo-temporal alignment takes data within an acceptable range based on load changes in the system. Pseudo-temporal alignment systems typically utilize a global positioning system (GPS) or network time protocol (NTP) for clock synchronization. Automatic temporal alignment implementations are described in commonly assigned U.S. patent application Ser. No. 11/174,099, filed Jul. 1, 2005, entitled "Automated Precision Alignment of Data in a Utility Monitoring System." In an automatic temporal alignment implementation, the data alignment system 104 aligns all IEDs (represented by M) in an electrical system hierarchy to the zero-crossing of all three phase voltages without the use of additional hardware, notwithstanding potential phase shifts between various IEDs, such as those caused by certain transformer configurations. When the data of the monitoring devices is aligned with each other, the system data is essentially aligned with respect to the time it occurred, making more complex data analyses feasible.

Once the data from each IED M is aligned and each IED's position is determined within the hierarchy, the data is said to be in context 108. The contextual data 108 can be used by software applications 110 to provide and diagnose useful information about the utility system 102 beyond what is generally available if the data is not in context. Each IED measures characteristics of the utility system 102, and quantifies these characteristics into data that can be analyzed by a computer. For example, the monitoring device may measure power, energy, or other characteristics of electricity. In the electrical context, the IED may be based on a PowerLogic® Series 3000/4000 Circuit Monitor or a PowerLogic® ION7550/7650 Power and Energy Meter available from Schneider Electric or any other suitable IED device such as a microprocessor-based circuit breaker, relay, metering device, or power meter.

A user interacts with the software applications 110 via a conventional user interface 112. The software applications 110 can be linked to other systems 114, such as a billing system, and use the contextual data 108 to communicate messages between the other systems 114 and the user interface 112.

Generally, the hierarchy classification system 106 utilizes an auto-learned hierarchy algorithm in the monitoring system software that is based on rules and statistical methods. Periodically, the monitoring system software polls each monitoring device in the utility system 102 to determine certain characteristics or parameters of the utility system 102 at that node (represented by M). Multiple samples of specified parameters are taken from each IED in the system at the same given point in time. Once the parameter data is collected from each node M in the utility system 102, the auto-learned hierarchy algorithm analyzes the data and traces the relationships or links among the monitoring devices with respect to the time the data sample was taken and the associated value of the data sample. This analysis may be performed periodically to increase the probability that the hierarchy is accurate, or to ascertain any changes in the hierarchy. Once this iterative process reaches some predetermined level of statistical confidence that the determined layout of the utility system 102 is correct, the auto-learned hierarchy algorithm ends. The final layout of the utility system 102 is then presented to the user for concurrence. As each IED's data is evaluated over time (the learning period) with respect to all other IEDs using the auto-learned hierarchy algorithm, a basic layout of the hierarchical structure of the utility system 102 is determined based on the monitoring points available. In this respect, the auto-learned hierarchy algorithm uses historical trends of the data from each IED, and those trends are compared to determine whether any interrelationship (link) exists between the IEDs. A more detailed hierarchical structure can be determined with more monitoring points available for analysis.

Samples of specific electrical characteristics or parameters (such as power, voltage, current, or the like) are simultaneously taken from each IED in the utility system 102. This data is stored and analyzed with respect to the time the sample is taken, the associated value of the data point, and the IED providing the data.

Data taken from each IED in the utility system 102 is compared with each other to determine whether any correlation exists between the IEDs. The data is analyzed for statistical trends and correlations as well as similarities and differences over a predetermined period of time.

Figure 1B:
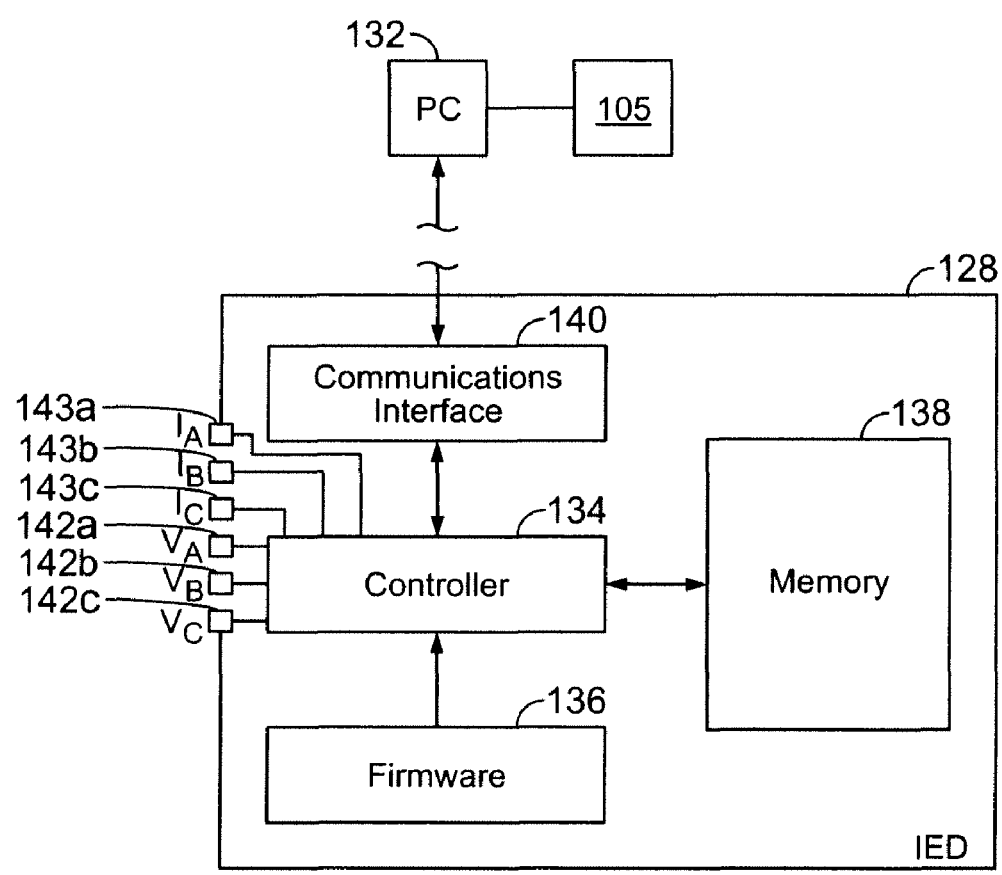
FIG. 1B is a functional block diagram of an exemplary intelligent electronic device.

An exemplary IED 128 is shown as a functional block diagram in FIG. 1B. The IED 128 includes a controller 134, firmware 136, memory 138, a communications interface 140, and three phase voltage conductor connectors 142a,b,c, which connect to the $V_A$, $V_B$, and $V_C$ phase voltage conductors, respectively, and are coupled to the controller 134. Three phase current conductor connectors 143a,b,c, which connect to the $I_A$, $I_B$, and $I_C$ phase current conductors, respectively, are optionally coupled to the controller 134. The firmware 136 includes machine instructions for directing the controller to carry out operations required for the monitoring device. Memory 138 is used by the controller 134 to store electrical parameter data measured by the IED 128.

Instructions from a computer 132 are received by the IED 128 via the communications interface 140. Those instructions include instructions that direct the controller 134 to mark the cycle count, to begin storing electrical parameter data, or to transmit to the computer 132 electrical parameter data stored in the memory 138. The electrical parameter data can include any data acquired by IEDs, including any combination of frequency variations, amplitude variations, and phase variations.

The data integrated monitoring system 100 also includes a multi-source hierarchical classification system 105, which may receive device data associated with the utility system 102 via manual or automated methods or time-aligned data that has been automatically generated by the automated data alignment system 104. Examples of multi-source hierarchical classification systems are described in commonly assigned U.S. patent application Ser. No. 12/151,309, filed May 6, 2008, titled "Automated Hierarchical Classification For Utility Systems With Multiple Sources."

Figure 2A:
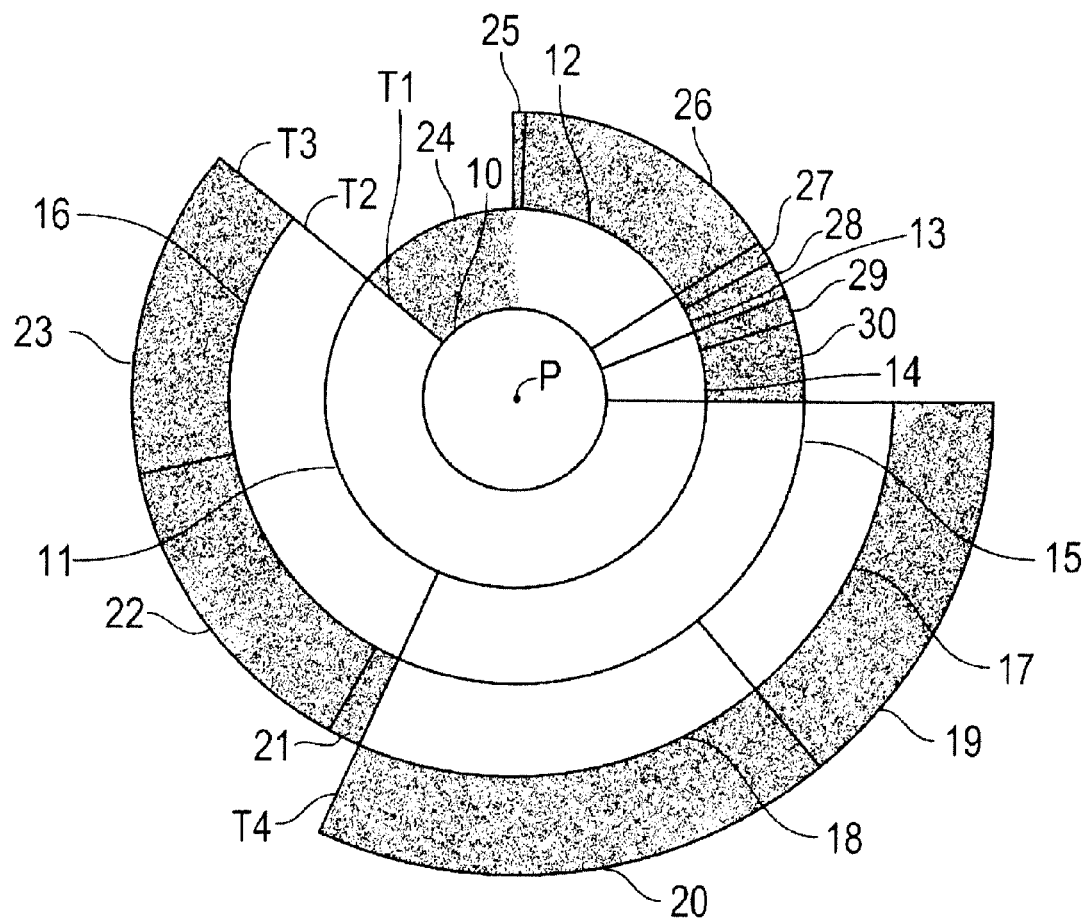
FIG. 2A is a graphical representation of the energy consumption in multiple parts of a utility system, using a polar coordinate system.

FIG. 2A is an example of a graphical representation of an electrical power monitoring system using a polar coordinate system, which is a two-dimensional coordinate system. Although this example is for an electrical power monitoring system, it will be understood that the graphical representation may be used with any of the other WAGES utility systems mentioned above. The relationship between two points in a polar coordinate system is expressed in terms of angles and distance, i.e., each point is determined by two polar coordinates: the radial coordinate and the angular coordinate. The radial coordinate (denoted as r) denotes the point's distance from a central point (known as the pole). The angular coordinate (also known as the polar angle or the azimuth angle, and denoted by θ) denotes the positive or counterclockwise angle required to reach the point from the 0° ray or polar axis.

In the diagram in FIG. 2A, the innermost circle 10 having the pole P as its center represents the total energy being consumed in a monitored power distribution system having the following simple tree hierarchy:

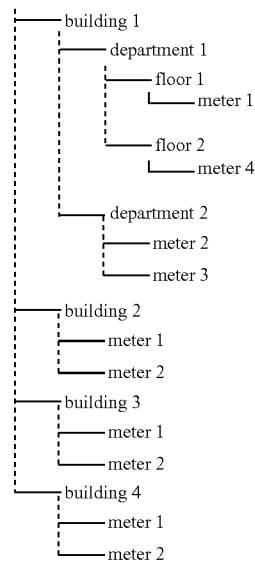

It can be seen that the above system supplies power to four buildings. In the graphical representation in FIG. 2A, the central disk 10 represents the topmost node in the hierarchy which represents the total sum of the measured quantity. This central figure is also called the root node or tier 0. There may or may not be metering data available directly for the root node depending on the electrical network. If there is no metered data at that point, then the value of the root node is just the sum of the values for all its children. The next tier out from the root in this diagram shows the four buildings and their relative energy consumptions are represented by four segments 11, 12, 13 and 14 of an annular ring T1 surrounding the disc 10. For example, building #1 consumes 62% of the total energy consumed by the four buildings, so the segment 11 representing building #1 subtends an angle of 223.2 degrees, which is 62% of the 360-degree circumference of the annular ring T1.

Within building #1, the electrical power is separately monitored for each of two departments, which together subtend an angle of 223.2 degrees on the second tier of the hierarchy represented by an annular ring T2 surrounding the first-tier annular ring T1. The two segments 15 and 16 representing the two departments in building #1 occupy the same 223.2 degrees occupied by segment 11 of the annular ring T1, which indicates that the two departments represented by segments 15 and 16 of annular ring T2 are subordinate to the building #1 represented by segment II of annular ring T1.

Within department #1, represented by segment 15, the electrical power is separately monitored for each of two floors, which together constitute 30% of the overall total energy represented by the diagram. The two segments 17 and 18 representing the two floors in department #1 together occupy the same 108 degrees occupied by segment 15 of the annular ring T2, which indicates that the two floors represented by segments 17 and 18 of T3 are subordinate to department #1 represented by segment 15 of annular ring T2.

Within floor #1 of department #1, the electrical power is monitored solely by meter #1, which constitutes 14% of the overall total of the hierarchy. Meter #1 is represented by a shaded arc segment 19 subtending 50.4 degrees within the fourth-tier annular ring T4, which is concentric with and outside the third-tier annular ring T3. Similarly, within floor #2, the electrical power is monitored solely by meter #4, which constitutes 16% of the overall total of the hierarchy. Meter #4 is represented by a shaded arc segment 20 subtending 57.6 degrees within the fourth-tier, annular ring T4. As the sole meter for floor #1 is meter #1, segment 19 is the same angular width as segment 17. Similarly, as the sole meter for floor #2 is meter #4, segment 20 is the same angular width as segment 18.

Within department #2 of building #1, the electrical power is monitored by three meters represented by shaded arc segments 21, 22 and 23 in annular ring T3. In building #2, the electrical power is monitored by three meters, one of which is represented by the shaded portion of arc segment 24 in annular ring T1, and the other two are represented by the shaded arc segments 25 and 26 in annular ring T3. Within building #3, the power is monitored by two meters represented by shaded arc segments 27 and 28 in annular ring T2. Within building #4, the power is monitored by two meters represented by shaded arc segments 29 and 30 in annular ring T2.

Thus, it can be seen that FIG. 2A is a graphical representation of the relative values of the energy consumption at the multiple monitoring points with the different segments of the multiple circular areas having (1) sizes representative of the magnitudes of the different energy consumptions and (2) locations representative of the hierarchy of the monitoring points. The angular extent of each segment represents the magnitude of the electrical power used in the portion of the system represented by that segment, and segments lying on a common radius through different circular areas represent the fractional size of the monitored parameter for the monitoring points relative to the overall total for that parameter. The radial and circumferential locations of the segments represent the hierarchy of the multiple monitoring points.

The following is a description of a sequence of operations for assembling the information needed to draw the circular energy diagram of FIG. 2A, and then using that information to draw the diagram:

Part 1—Assemble a Table of Calculated Values.

Start with a hierarchy of nodes with energy measurements associated with some or all of the nodes. The energy measurement for a node will be referred to as the "Native Quantity" for that node to distinguish it from other derived energy values associated with the node. If a node does not have any measurement of its own, its Native Quantity is zero.

1) For each node, assign a Ring number which is equal to the distance down the hierarchy from the root node, where the root has ring number 0, all immediate children of the root have Ring number 1, all immediate children of each node of ring number 1 have ring number 2, their children have ring number 3, and so on until all nodes in the diagram have an assigned ring number.

2) For each node, enumerate all of its descendents (immediate children, their children and so on) and add up the Native Quantities for all of them, and save the resulting number as the "Inherited Quantity" for the original node. Repeat this process for every node in the system. If a node has no children, its Inherited Quantity is zero.

3) For each node in the system, add the Inherited Quantity and the Native Quantity and call the result the "Total Quantity" for that node. The Total Quantity for the root node has special significance, but it does not have any unique name other than "Total Quantity for the root node."

4) For each node, compute the quantity "Segment Width," which is the Total Quantity for that node divided by the Total Quantity for the root node and multiplied by 360. This is the angular size within the segment that represents the energy consumption for this node, in degrees.

5) For each node, compute the quantity "Fill Width," which is the Native Quantity for that node divided by the Total Quantity for the root node and multiplied by 360. This is the angular size within the segment that is shaded in the diagram, representing the energy consumption metered at this node, in degrees.

6) Traverse the nodes in tree order to fill in the Start Coordinate for each node, as follows:

Start coordinate=Start coordinate of its parent+Fill Width of parent+the sum of the segment width of all siblings of the current node that have already had their Start Coordinates calculated.

For the root node, the Start Coordinate and Fill Width of its parent are both treated as zero. Siblings are two or more arc segments with the same parent and the same ring number.

The following is a sample table for the diagram in FIG. 2A:

|  | Segment | Ring Number | Native Quantity | Inherited Quantity | Total Quantity | Start Coordinate | Segment Width | Fill Width |
|---|---|---|---|---|---|---|---|---|
|  | <root> | 0 | 0 | 12345 | 12345 | 0 | 360 | 0 |
| ├— building 1 | Building 1 | 1 | 0 | 7653.9 | 7653.9 | 0 | 223.2 | 0 |
| │ ├— department 1 | Building 1 Dept 1 | 2 | 0 | 3703.5 | 3703.5 | 0 | 108 | 0 |
| │ │ ├— floor 1 | Dept 1 Floor 1 | 3 | 0 | 1728.3 | 1728.3 | 0 | 50.4 | 0 |
| │ │ │ └— meter 1 | Floor 1 Meter 1 | 4 | 1728.3 | 0 | 1728.3 | 0 | 50.4 | 50.4 |
| │ │ └— floor 2 | Dept 1 Floor 2 | 3 | 0 | 1975.2 | 1975.2 | 50.4 | 57.6 | 0 |
| │ │    └— meter 4 | Floor 2 Meter 4 | 4 | 1975.2 | 0 | 1975.2 | 50.4 | 57.6 | 57.6 |
| │ └— department 2 | Building 1 Dept 2 | 2 | 0 | 3950.4 | 3950.4 | 108 | 115.2 | 0 |
| │    ├— meter 2 | Dept 2 Meter 2 | 3 | 2098.65 | 0 | 2098.65 | 108 | 61.2 | 61.2 |
| │    └— meter 3 | Dept 2 Meter 3 | 3 | 1851.75 | 0 | 1851.75 | 169.2 | 54 | 54 |
| ├— building 2 | Building 2 | 1 | 1481.4 | 1728.3 | 3209.7 | 223.2 | 93.6 | 43.2 |
| │ ├— meter 1 | Building 2 Meter 1 | 2 | 123.45 | 0 | 123.45 | 266.4 | 3.6 | 3.6 |
| │ └— meter 2 | Building 2 Meter 2 | 2 | 1604.85 | 0 | 1604.85 | 270 | 46.8 | 46.8 |
| ├— building 3 | Building 3 | 1 | 0 | 740.7 | 740.7 | 316.8 | 21.6 | 0 |
| │ ├— meter 1 | Building 3 Meter 1 | 2 | 246.9 |  | 246.9 | 316.8 | 7.2 | 7.2 |
| │ └— meter 2 | Building 3 Meter 2 | 2 | 493.8 |  | 493.8 | 324 | 14.4 | 14.4 |
| └— building 4 | Building 4 | 1 |  | 740.7 | 740.7 | 338.4 | 21.6 | 0 |
|    ├— meter 1 | Building 4 Meter 1 | 2 | 185.175 |  | 185.75 | 338.4 | 5.4 | 5.4 |
|    └— meter 2 | Building 4 Meter 2 | 2 | 555.525 |  | 555.525 | 343.8 | 16.2 | 16.2 |

Start Coordinate, Segment Width, and Fill Width are all measured in degrees for the circular diagram.
Native Quantity, Inherited Quantity and Total Quantity are measured in energy units or whatever parameter is being displayed
Supplied values:

| | |
|---|---|
| Ring Number | The number of levels down the hierarchy from the root node, from hierarchy diagram. |
| Native Quantity | Measured from a meter at that node. |
| Derived values: | |
| Inherited Quantity | Sum of native quantities of all children of a node, and their children and so on. |
| | Equivalent to sum of total quantity of immediate children without going any further down the hierarchy. |
| Total Quantity | Sum of Native and Inherited Quantities. |
| Start Coordinate | Start Coordinate of parent + Fill Width of parent + segment width of any siblings already drawn. |
| Segment Width | Total Quantity/Total Quantity of root node * 360 |
| Fill Width | Native Quantity/Total Quantity of root node * 360 |
| Definitions: | |
| Siblings | Two or more arc segments with the same parent and the same ring number. |
| Root node | The topmost point in the hierarchy, represented by the central disk in the circular diagram. |

Part 2—Draw the Figure

Assume a constant has been supplied for the ArcThickness, which is appropriate to the coordinate system in use.

Figure 2B:
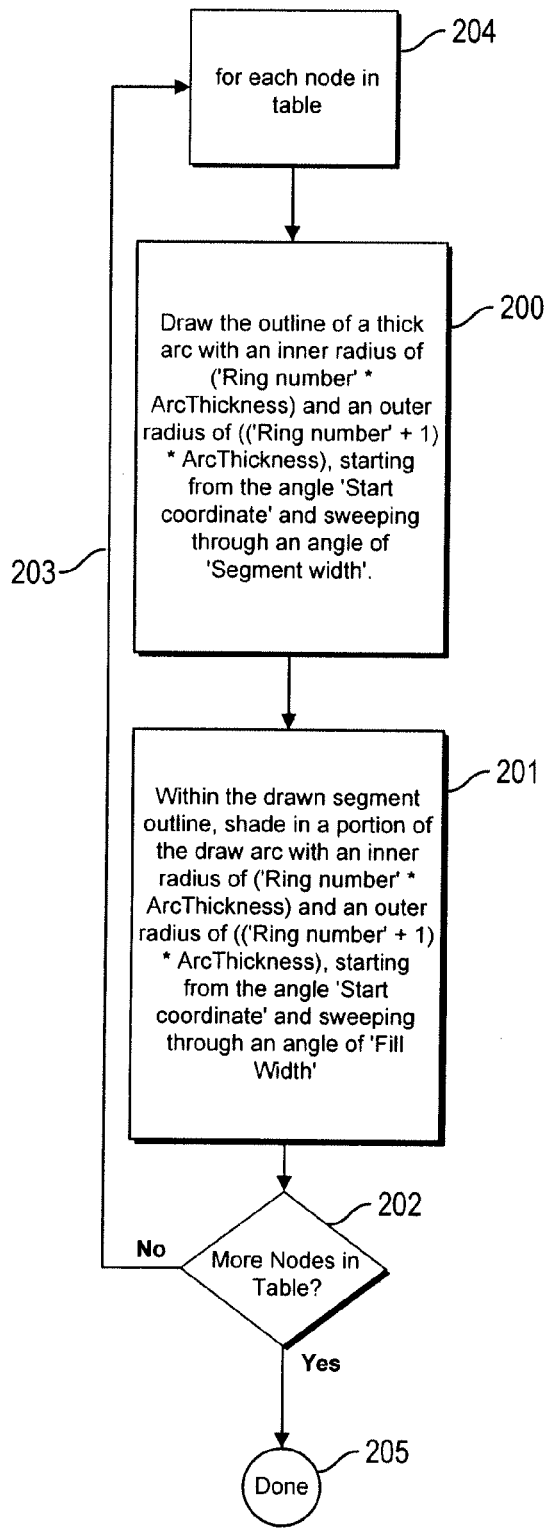
FIG. 2B is a flow chart of a routine for generating the graphical representation of FIG. 2A.

Using the routine illustrated by the flow chart in FIG. 2B, iterate through each node in the table prepared in Part 1, as follows:

1) At step 200 in FIG. 2B, draw the outline of a thick arc with an inner radius of (Ring Number*ArcThickness) and an outer radius of ((Ring Number+1)*ArcThickness), starting from the angle Start Coordinate and sweeping through an angle of Segment Width.

2) At step 201, within the drawn segment outline, shade in a portion of the drawn arc with an inner radius of (Ring Number*ArcThickness) and an outer radius of ((Ring Number+1)*ArcThickness), starting from the angle Start Coordinate and sweeping through an angle of Fill Width.

Step 202 determines whether additional nodes still exist, and if the answer is affirmative, the system returns at 203 to reiterate the process, beginning at step 204 When step 102 yields a negative answer, the routine is terminated at step 205.

Although energy is the parameter used in the above example, any other aggregatable parameter can be substituted with equal applicability, provided that the parameter is something that can be measured and added.

Figure 3:
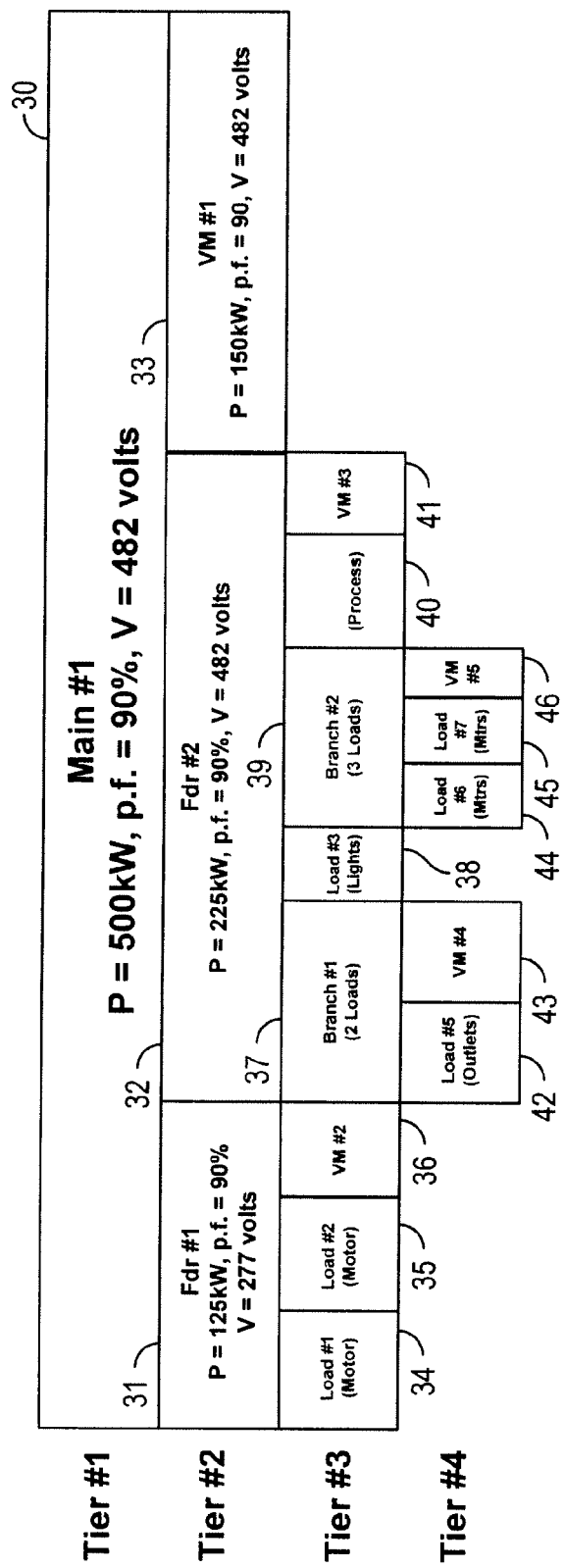
FIG. 3 is a graphical representation of the energy consumption in multiple parts of a utility system, using a rectangular coordinate system.

FIG. 3 is an example of a graphical representation of an electrical power monitoring system using a two-dimensional rectangular (Cartesian) coordinate system, which is used to determine each point uniquely in a plane through two numbers, usually called the x-coordinate or abscissa and the y-coordinate or ordinate of the point. To define the coordinates, two perpendicular directed lines (the x-axis, and the y-axis), are specified, as well as the unit length, which is marked off on the two axes.

In the diagram in FIG. 3, the uppermost tier T1 is a single rectangle 30 representing the total energy being consumed from a single main in the monitored power distribution system. The second tier T2 comprises three rectangles representing the distribution of power from the single main among two monitored feeders 31 and 32 and one monitored feeder 33. A virtually monitored load is a load that does not have a real monitor but whose consumption is inferred from other measured loads. The third tier T3 represents the distribution of power from the two real feeders 31 and 32. Specifically, approximately equal amounts of power from the feeder #1 (rectangle 31) are consumed by a pair of motors identified as load #1 and load #2, as represented by rectangles 34 and 35, and a third rectangle 36 represents a virtual meter VM#2 monitoring the residual power consumed through feeder #1. Feeder #2 supplies power to branch #1 (two loads) represented by rectangle 37, branch #2 (three loads) represented by rectangle 38, load #3 (e.g., lights) represented by rectangle 39, and load #4 (e.g., a process) represented by rectangle 40, and a fifth rectangle 41 represents a virtual meter VM#3 monitoring the residual power consumed through feeder #2.

Branch #1 supplies power to a real load #5 (e.g., outlets) represented by rectangle 42, and rectangle 43 represents a virtual meter VM#4 monitoring the residual power consumed through branch #1. Branch #2 supplies power to a real load #5 (e.g., outlets) represented by rectangle 42, and rectangle 43 represents a virtual meter VM#4 monitoring the residual power consumed through branch #1.

FIG. 3 also illustrates enhancement of the graphical representation by superimposing "overlays" of operational parameters for the different segments of the hierarchy. In the illustrated example, the operational parameters include power, power factors, voltages and descriptive terms, but there are numerous other values and descriptors that could be displayed, depending on the nature of the monitored system and the user's preferences and objectives. For example, nameplate data or other characteristics for specific loads, such as the type of motor, rated horsepower full-load current, insulation class and the like, may be displayed. The displayed data may be dynamic and/or static. These overlays may provide a concise representation of the status of the utility system at any given time.

The graphical representations of FIGS. 2A and 3 can be enhanced in several ways. For example, particular power system components being utilized in the system can be represented, such as by use of a red dotted line as the interface between two segments to indicate the presence of a step-down transformer at that location. A blue dotted line can be used to indicate a step-up transformer. Other power system components can be represented by a variety of different objects, lines, symbols and/or colors. An entire segment may be displayed in different colors to indicate, for example, whether the parameter whose value is represented by the size of that segment has been increasing or decreasing over a given time interval.

Other two-dimensional geometries may be used for the graphical representations. For example, a triangular representation may be used with tier 1 at the apex of the triangle, followed by successive rows below tier 1 representing increasingly subordinate tiers. Also, three-dimensional geometric shapes such as pyramids, cylinders and cones may be used, with each tier wrapping around the 3-D shape for viewing by rotation of the shape, thereby allowing the display of more complex hierarchies within a given display area such as a computer screen.

Figure 4:
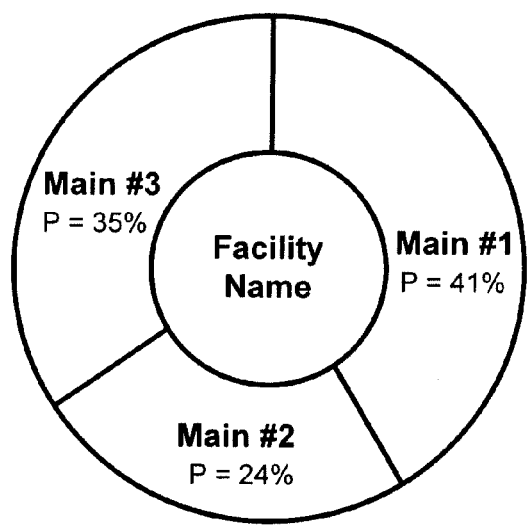
FIG. 4 is a graphical representation of an electrical power distribution system having multiple mains.
Figure 5:
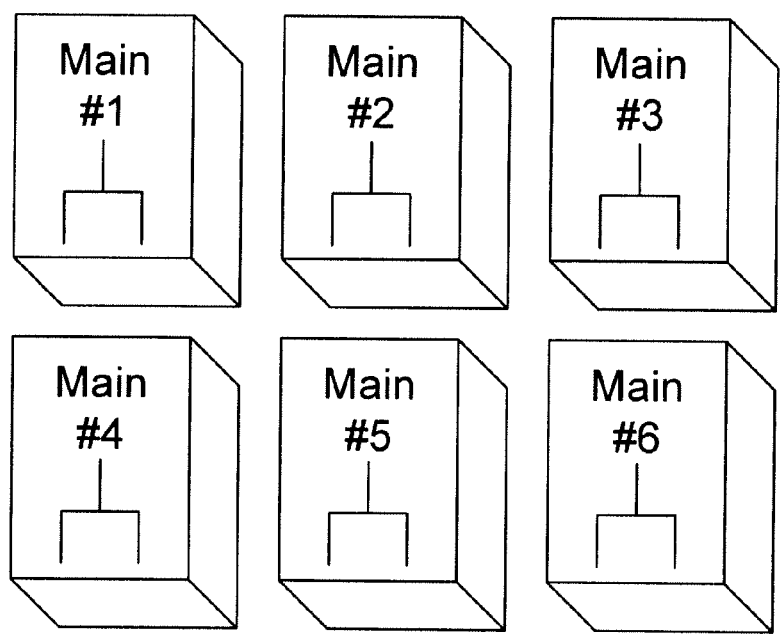
FIG. 5 is an illustration of multiple icons each of which represents a different main an electrical power distribution system.

In an electrical power distribution system that includes multiple mains, each main typically has its own hierarchy, but the hierarchies of the multiple mains may be aggregated in a graphical representation, as illustrated in FIG. 4. Alternatively, a separate icon may be displayed for each main, as illustrated in FIG. 5, and then each icon can be "opened" (e.g., by clicking on it) to display a graphical representation of the hierarchy of monitoring points for that particular main.

The sizes of the various segments in the graphical representation will change from time to time as energy consumption varies throughout the system. The time intervals at which the graphical representation is re-drawn to update the segment sizes may be adjusted to accommodate the needs of different users. Most monitoring systems accumulate, and discard, data at rapid rates, but the graphical representations typically do not need to be updated at the same rate at which new data is acquired by the monitors.

The graphical representation can also be used to signal alarm conditions by highlighting, flashing or outlining one or more segments in which an alarm condition has occurred. Examples of such alarm conditions as exceeding a threshold, an improper configuration, a failed component, and a need for a firmware upgrade.

Examples of commercially available software for utility monitoring systems are the "enterprise energy management" (EEM) and "ProActive Logic" (PAL) systems available from Schneider Electric in LaVergne, Tenn.

While particular embodiments and applications of the present invention have been illustrated and described, it is to be understood that the invention is not limited to the precise construction and compositions disclosed herein and that various modifications, chances, and variations may be apparent from the foregoing descriptions without departing from the spirit and scope of the invention as defined in the appended claims.

What is claimed is:

1. A method of graphically representing values of at least one selected parameter at multiple monitoring points in a utility system, said at least one selected parameter including electrical power supplied to portions of an electrical power distribution system that correspond to said multiple monitoring points, said method comprising
receiving data measured at said multiple monitoring points,
determining the values of said selected parameter at said multiple monitoring points, based on said received data, and
using said values to generate a graphical representation of the values of said selected parameter at said multiple monitoring points, said graphical representation including shapes having (1) sizes representative of the magnitudes of said values and (2) locations representative of the hierarchy of said monitoring points.

2. The method of claim 1 in which said at least one selected parameter includes energy consumed in portions of an electrical power distribution system that correspond to said multiple monitoring points.

3. A method of graphically representing values of at least one selected parameter at multiple monitoring points in a utility system, comprising
receiving data that includes at least one of measured data and virtual data for each of said multiple monitoring points,
determining the values of said selected parameter at said multiple monitoring points, based on said received data, and
using said values to generate a graphical representation of the values of said selected parameter at said multiple monitoring points, said graphical representation including shapes having (1) sizes representative of the magnitudes of said values and (2) locations representative of the hierarchy of said monitoring points.

4. A method of graphically representing values of at least one selected parameter at multiple monitoring points in a utility system, comprising
receiving data measured at said multiple monitoring points,
determining the values of said selected parameter at said multiple monitoring points, based on said received data, and
using said values to generate a graphical representation of the values of said selected parameter at said multiple monitoring points, said graphical representation including shapes having (1) sizes representative of the magnitudes of said values and (2) locations representative of the hierarchy of said monitoring points, said shapes including at least one of
segments of concentric circular areas in which the angular extent of each segment represents the magnitude of at least one of said values, and the radial and circumferential locations of said segments represent the hierarchy of said monitoring points, and
segments of rectangular areas in which the width of each segment represents the magnitude of at least one of said values, and the locations of said segments relative to each other represent the hierarchy of said monitoring points.

5. The method of claim 4 in which successive shapes along a common radial line from the center of said concentric circular areas are increasingly subordinate to other shapes on that common radius.

6. The method of claim 4 in which the angular extents of said segments of circular areas having a common radius represent the fractional size of said selected parameter for said monitoring points relative to the overall total for said parameter.

7. The method of claim 4 in which said segments of rectangular areas are arranged in multiple horizontal rows with the uppermost row representing the highest hierarchical level, and the segments in successive rows below said uppermost row are increasingly subordinate to the adjacent segment in the immediately preceding row.

8. The method of claim 4 in which the lateral dimensions of the segments in a common row represent the relative values of said selected parameter for said monitoring points in a common hierarchical level.

9. The method of claim 1 in which said electrical power distribution system that includes multiple mains, and which includes separate hierarchies of said monitoring points for each of said multiple mains.

10. A method of graphically representing values of at least one selected parameter at multiple monitoring points in a utility system, comprising
receiving data measured at said multiple monitoring points,
determining the values of said selected parameter at said multiple monitoring points, based on said received data, and
using said values to generate a graphical representation of the values of said selected parameter at said multiple monitoring points, said graphical representation including shapes having (1) sizes representative of the magnitudes of said values and (2) locations representative of the hierarchy of said monitoring points, said graphical representation being displayed at a selected monitoring point that is identified in the graphical representation.

11. A method of graphically representing values of at least one selected parameter at multiple monitoring points in a utility system, comprising
receiving data measured at said multiple monitoring points,
determining the values of said selected parameter at said multiple monitoring points, based on said received data, using said values to generate a graphical representation of the values of said selected parameter at said multiple monitoring points, said graphical representation including shapes having (1) sizes representative of the magnitudes of said values and (2) locations representative of the hierarchy of said monitoring points, and displaying data related to any selected segment in said graphical representation in response to the selection of that segment.

12. The method of claim 11 in which said displayed data includes identification of particular electrical power system components being utilized in portions of a power distribution system corresponding to the different segments.

13. The method of claim 12 in which said displayed data includes identification of selected parameters of at least some of said components.

14. The method of claim 11 in which said displayed data includes data for virtually monitored loads.

15. A method of graphically representing values of at least one selected parameter at multiple monitoring points in a utility system, comprising receiving data measured at said multiple monitoring points, determining the values of said selected parameter at said multiple monitoring points, based on said received data, and using said values to generate a graphical representation of the values of said selected parameter at said multiple monitoring points said graphical representation including shapes having (1) sizes representative of the magnitudes of said values and (2) locations representative of the hierarchy of said monitoring points, said graphical representation being generated in successive displays, beginning with a generalized display of at least a portion of the hierarchy followed by detailed displays of selected portions of the hierarchy.

16. The method of claim 15 in which said generalized display includes multiple electrical power mains, and said detailed displays include a separate hierarchy for each of said power mains.

17. The method of claim 12 in which said component identifications include data relating to at least one characteristic selected from the group consisting of electrical characteristics, mechanical characteristics and nameplate characteristics.

* * * * *